Patented June 11, 1940

2,203,701

UNITED STATES PATENT OFFICE 2,203,701

RUBBER PROCESS AND PRODUCT

Thomas Lewis Shepherd, London, England

No Drawing. Application September 16, 1935, Serial No. 40,859. In Great Britain September 18, 1934

11 Claims. (Cl. 28—1)

This invention relates to the manufacture of filaments and threads from coagulable liquids or substances and of fabrics incorporating such threads, such threads being produced in any known way, as by extrusion, printing, rotary discs, wires and the like. More particularly the invention relates to threads that are prepared from latex, an aqueous dispersion of rubber either artificial or natural but particularly the latter hereinafter called latex.

This application is a continuation in part of my co-pending application Serial No. 34,855, filed August 5, 1935.

Such rubber-like threads are not easily controlled when they are being woven or knitted into a fabric, and the object of the invention hereinafter described is to employ a particular solution from which the thread is formed, whereby the threads when they are being woven will be substantially inextensible so that they can be conveniently handled and manipulated whilst in the loom. After the fabric has been made, it is subjected to boiling or warm washing or other treatment and this will have the effect of again restoring to the rubber threads the whole or a part of their original elasticity.

The invention will now be described by way of example, it being understood that the nature of the invention will be specified in the accompanying claims.

The setting agent may be glue or gelatine and similar proteins, casein albumen and the like, natural and synthetic resins and gums which are water or alkali soluble, cellulose esters, e. g. methyl cellulose, and inorganic or organic substances which dissolve in water or dilute alkalies to give solutions which are miscible with latex, and which on evaporation preferably yield a coherent water or alkali soluble film.

The following illustrates broadly one method of manufacture of thread according to the invention. A suitable mix of latex and fillers, vulcanising agents, fibres, and/or the like, is mixed with a quantity of gelatine or glue, sugar, synthetic resin, or any binding material which is miscible with latex, in suitable proportions. As an example I take a weight of gelatine or glue equal to 20% of the dry rubber content of the latex to be used and dissolve same in water in the usual way adding a small percentage of preservative and of sugar, glucose, or other material capable of increasing the tensile strength of the gelatine or glue. The gelatine or glue itself should also have a high tensile strength and a high moisture resistance. On dissolution the gelatine or glue is filtered, cooled and added to the latex the whole being vigorously mixed to ensure an efficient distribution of the gelatine (or glue) and rubber. It will usually be found necessary to heat the mixture in order to prevent setting or gelatinising and it is essential to maintain the mixture at a constant temperature in order to preserve a regular degree of viscosity. A continuous thread or tape, round or otherwise, is then formed by any known means such as for example extrusion, the mixture being coagulated by a rubber coagulant such as acetic or formic acid alone or mixed with formaldehyde or other reagent capable of partially insolubilizing the gelatine or glue content.

If the coagulation is effected with acetic or formic acid alone, the formaldehyde treatment is effected subsequently.

The following are examples of how the invention may be carried into effect to produce the non-extensible thread:

Example 1

| | Parts by weight |
|---|---|
| 75% concentrated latex | 130 |
| Sulphur | 2.25 |
| Zinc oxide | 3.0 |
| Accelerator | 0.75 |
| Agerite white | 0.5 |
| 10% casein solution | 5.0 |

The latex mixture is warmed slightly, and to it is added—whilst stirring is effected—50% glue solution in such a quantity as will correspond with 15 parts of dry glue to 85 parts of dry rubber. The compositiotn is extruded warm or even hot into a coagulation bath, which may comprise a warm or hot solution of the following composition:

| | Parts by weight |
|---|---|
| Alcohol | 75 |
| 40% solution of formaldehyde | 10 |
| Acetic acid | 15 |

The coagulation bath solution need not of necessity be hot or warm, but may also be cold, provided that the extrusion or thread making point where the mix in thread form leaves the thread forming point is kept warm or hot.

A thread prepared by extrusion and subsequent coagulation, as indicated above, may be dried, and if desired vulcanised.

The above mentioned coagulation bath renders the glue partially insoluble and to that extent modifies the elasticity of the thread.

Example 2

According to this example, 15 parts by weight of a 33% glue solution are added at 25° C. to 161 parts by weight of the latex mixture set out in Example 1. To 176 parts of this composition, 50 parts of methyl cellulose in the form of a 10% aqueous solution are added. The whole is milled, and, for instance, extruded into the form of a thread, a convenient coagulant being:

| | Parts by weight |
|---|---|
| Acetic acid | 15 |
| Acetone | 97 |
| Cellulose acetate | 3 |

Such thread is dried and the glue is rendered partially insoluble to the desired extent by formaldehyde solution.

When it is desired to de-set the thread, or a yarn spun from the thread, it may be immersed in cold water for about twelve hours, and then boiled for about one hour in the same bath, after which the thread will be found to be vulcanised.

When gelatine, glue, synthetic resin or other setting agent which are capable of being rendered insoluble is employed, the thread may be given a permanent but limited degree of stretch, e. g. up to 10% only. For this purpose after drying the thread is passed through a bath of water, alcohol, acetone, and/or the like containing formaldehyde, alum, bichromate of potash or similar reagents, capable of rendering the gelatine, glue, synthetic resin or other "setting" material insoluble in water and therefore permanently incorporated in the rubber thread, when the percentage of hardening reagent used being sufficient to render the "setting" substance partially insoluble in water even at boiling point.

An additional method of producing a thread of limited stretch is to add to the aqueous dispersion of rubber viscose or cellulose in combination with a suitable liquid, for example cellulose in caustic soda. In this case the mixed thread can also be dyed with ordinary direct dyestuffs. An advantage of the addition of cellulose is that the thread produced is largely or wholly non-tacky.

After winding, weaving, or whenever desired the immersion of the mixed thread (or article containing it) into hot water (preferably boiling), or in some cases cold water suffices to remove the still soluble setting agent allowing the rubber thread to resume its normal flexibility.

If it is desired that the set rubber thread shall retract upon removal of the "setting" medium this may be achieved by stretching it to the desired degree; during this operation the yarn is steamed or otherwise subjected to moisture in order to allow the stretch to take place without strain or damage to the thread. On completion of the stretching operation the yarn is again dried and "set". On removal of the unaffected setting substance as already described the rubber thread will automatically retract and in part regain its normal length or extension, depending on the quantity of insoluble setting agent permanently imparted to the thread.

The stretching operation may be carried out as and when the mixed thread is passed through a bath containing formaldehyde, alum, bichromate of potash or other reagent capable of hardening the non-rubber content.

As regards restoring elasticity, this can be done as described by soaking or boiling in water. It is found that boiling can be arranged also to vulcanise the thread, if no separate operation is used. It is also found that the boiling operation affords an opportunity for another operation, namely, dyeing.

After weaving, knitting, or any other time at which it is desired to dye or colour the rubber product, this or the cloth or other article containing it is immersed in a bath of water (preferably boiling) containing ordinary dyestuffs. The gelatine or other setting agent is then largely or wholly dissolved out and the rubber dyed to the desired shade.

It will be found that the dye has penetrated evenly—or largely so—throughout the rubber, which has been impossible by methods hitherto employed. It should be stressed that no special dyestuffs are necessary and that the rubber may be dyed at the same time and in the same bath as yarns or cloths of textile origin particularly those of vegetable nature such as cotton, linen, and artificial silk. Should fibres of these materials have been incorporated in the rubber, thread, or other article these will be dyed at the same time.

I claim:

1. A process for preparing rubber threads in forming a thread from an aqueous dispersion of rubber to which has been added a soluble hydrophilic colloid in such a quantity as to produce a relatively inelastic thread, coagulating the formed thread, drying the coagulated thread and treating the dried thread with an agent for rendering the colloid partially insoluble whereby the insoluble colloid is permanently incorporated in the thread.

2. A process as claimed in claim 1 and further comprising the step of heating the thread in the presence of moisture and then stretching the same prior to the drying step.

3. The process as claimed in claim 1 wherein the hydrophilic colloid is glue and the agent for rendering the glue partially insoluble is formaldehyde.

4. A rubber thread containing a sufficient quantity of glue to render the thread substantially inelastic, said glue having been rendered partially insoluble by formaldehyde.

5. The process of manufacturing fabric consisting partly of inelastic rubber threads, in which the threads are prepared as in claim 1, and further comprising the step of forming the threads into a fabric.

6. A fabric comprising rubber threads containing a sufficient quantity of glue to render the threads inelastic, said glue having been rendered partially insoluble by formaldehyde.

7. A process for preparing rubber threads in a relatively inelastic form which consists in mixing an aqueous dispersion of rubber with a removable soluble hydrophilic colloid in a quantity sufficient to render the rubber inextensible when said colloid sets and forming a thread from said mixture.

8. A rubber thread containing a sufficient quantity of a removable hydrophilic colloid which is soluble in a substance selected from the group consisting of water and alkaline solutions whereby said thread is rendered inelastic.

9. A rubber thread containing a sufficient quantity of a removable water soluble hydrophilic colloid whereby said thread is rendered inelastic.

10. A rubber thread containing a sufficient quantity of a removable hydrophilic colloid which is soluble in alkaline solutions whereby said thread is rendered inelastic.

11. A fabric comprising rubber threads containing a sufficient quantity of a removable hydrophilic colloid which is soluble in a substance selected from the group consisting of water and alkaline solutions whereby said threads are rendered inelastic.

THOMAS LEWIS SHEPHERD.

CERTIFICATE OF CORRECTION.

Patent No. 2,203,701.　　　　　　　　　　　　　　　June 11, 1940.

THOMAS LEWIS SHEPHERD.

It is hereby certified that error appears in the printed specification of the above numbered patent requiring correction as follows: Page 2, second column, line 20, claim 1, strike out the words "a relatively inelastic form, which consists in" and insert the same before "forming" in line 18, same claim; and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.